(12) United States Patent
Chen (10) Patent No.: US 12,085,991 B2
(45) Date of Patent: Sep. 10, 2024

(54) DISPLAY PANEL AND DISPLAY DEVICE INCLUDING THE SAME

(71) Applicant: WUHAN CHINA STAR OPTOELECTRONICS SEMICONDUCTOR DISPLAY TECHNOLOGY CO., LTD., Hubei (CN)

(72) Inventor: Xia Chen, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 205 days.

(21) Appl. No.: 17/600,242

(22) PCT Filed: Aug. 9, 2021

(86) PCT No.: PCT/CN2021/111398
§ 371 (c)(1),
(2) Date: Sep. 30, 2021

(87) PCT Pub. No.: WO2023/004878
PCT Pub. Date: Feb. 2, 2023

(65) Prior Publication Data
US 2023/0034918 A1    Feb. 2, 2023

(51) Int. Cl.
*G06F 1/16*     (2006.01)
*B32B 3/08*     (2006.01)
*B32B 15/04*    (2006.01)

(52) U.S. Cl.
CPC ............ *G06F 1/1656* (2013.01); *B32B 3/085* (2013.01); *B32B 15/04* (2013.01); *B32B 2307/536* (2013.01); *B32B 2457/20* (2013.01)

(58) Field of Classification Search
None
See application file for complete search history.

(56) References Cited

U.S. PATENT DOCUMENTS

2021/0175156 A1*  6/2021  Chen ................ H01L 23/49838

FOREIGN PATENT DOCUMENTS

| CN | 107507518 A | 12/2017 |
| CN | 110544431 A | 12/2019 |
| CN | 110796955 A | 2/2020 |
| CN | 110853510 A | 2/2020 |
| CN | 111798751 A | 10/2020 |
| CN | 111986571 A | 11/2020 |
| CN | 112071207 A | 12/2020 |
| WO | WO-2021133010 A1 * | 7/2021 ....... G02F 1/133305 |

* cited by examiner

*Primary Examiner* — Xiaobei Wang
(74) *Attorney, Agent, or Firm* — Rivka Friedman (57) ABSTRACT

The present application proposes a display panel and a display device. The display panel includes a panel body and a composite bending support layer, and the composite bending support layer includes a first metal layer and a second metal layer; wherein, the first metal layer, at least located in the bending area of the display panel, includes a damascene area located in the non-bending area; the second metal layer, located in the non-bending area of the display panel, fills the damascene area; the material hardness of the first metal layer is greater than the material hardness of the second metal layer.

18 Claims, 6 Drawing Sheets

DISPLAY PANEL AND DISPLAY DEVICE INCLUDING THE SAME

FIELD OF INVENTION

The present application relates to the field of display panels, and in particular to a display panel and a display device.

BACKGROUND OF INVENTION

In current flexible and bendable panels, in order to improve the bending and recovery characteristics, a layer of stainless steel (Steel Use Stainless, SUS) is attached to the bottom of the panel as a flexible support layer. During the bending process, the flexible support layer MS deforms to disperse stresses of panel; during the recovery process, the flexible support layer MS deforms and recovers to lead the panel to be flat. This flexible support layer MS is generally thicker than other layers; the thickness of flexible support layer MS usually is about 150 um.

Below the stainless steel, in order to evenly disperse the heat and electromagnetic shielding generated during the use of the device, a heat dissipation layer HS will be added into the panel to increases the thickness of the entire flexible screen but not favorable to the thinning of the display panel; the material of heat dissipation layer HS is copper foil; the thickness of heat dissipation layer HS is usually about 80 um.

The embodiments of the present application provide a display panel and a display device to solve the over-thick issue due to the stacking of stainless steel layer and copper foil layer in the flexible and bendable panels.

SUMMARY OF INVENTION

In order to solve the above problems, the technical solutions provided by the application are as follows.

The application provides a display panel comprising a bending area and a non-bending area. The display panel further comprises a panel body and a composite bending support layer which is arranged on one side of the panel body. The composite bending support layer further comprises a first metal layer and a second metal layer.

Wherein, the first metal layer, at least located in the bending area of the display panel, includes a damascene area located in the non-bending area; the second metal layer, located in the non-bending area of the display panel, fills the damascene area; the material hardness of the first metal layer is greater than the material hardness of the second metal layer.

In one embodiment of the present disclosure, the non-bending area includes a first non-bending area and a second non-bending area, and the first non-bending area and the second non-bending area are respectively located on both sides of the bending area; the damascene area includes a first damascene area located in the first non-bending area and a second damascene area located in the second non-bending area; the second metal layer includes a first sub-layer of second metal filled in the first damascene area and a second sub-layer of second metal filled in the second damascene area.

In another embodiment of the present disclosure, the damascene area includes a plurality of damascene sub-areas arranged at intervals in the non-bending area, and the second metal layer includes a plurality of sub-layers of second metal which fill the damascene sub-area; wherein, in a direction perpendicular to the display panel, the thickness of the sub-layer of second metal filled in the damascene sub-area is less than or equal to the thickness of the composite bending support layer.

In another embodiment of the present disclosure, in a direction perpendicular to the display panel, the thickness of the second metal layer filled in the damascene area is equal to the thickness of the composite bending support layer; a contact surface, which is between the first metal layer and the second metal layer filled in the damascene area, and the horizontal plane of the display panel forms a predetermined angle.

In another embodiment of the present disclosure, the second metal layer includes at least a first convex portion and/or a first concave portion, which are located on one side of the contact surface between the second metal layer and the first metal layer; the first metal layer includes a second concave portion which matches with the first convex portion and/or a second convex portion which matches with the first concave portion.

In another embodiment of the present disclosure, in the direction perpendicular to the display panel, the thickness of the second metal layer filled in the damascene area is smaller than the thickness of the composite bending support layer; a projection of a contact surface of the second metal layer and the first metal layer on the display panel covers a projection of the second metal layer on the display panel.

In another embodiment of the present disclosure, in the direction perpendicular to the display panel, the thickness of each portion of the composite bending support layer is equal; the composite bending support layer includes an upper surface which is close to the panel body and a lower surface which is away from the panel body; on the upper surface or the lower surface, the first metal layer and the second metal layer are coplanar.

In another embodiment of the present disclosure, the thermal conductivity of the material of the first metal layer is less than the thermal conductivity of the material of the second metal layer.

In another embodiment of the present disclosure, the display panel includes a bending center line located in the bending area, and a plurality of stress-reducing structures are symmetrically located on both sides of the bending center line in the bending area on the composite bending support layer.

In another embodiment of the present disclosure, the material of the first metal layer is stainless steel, and the material of the second metal layer is copper foil.

The embodiments of this application also provide a display device, comprising a display panel which comprises a bending area and a non-bending area. The display panel includes a panel body and a composite bending support layer which is arranged on one side of the panel body. The composite bending support layer further includes a first metal layer and a second metal layer.

Wherein, the first metal layer, at least located in the bending area of the display panel, includes a damascene area located in the non-bending area; the second metal layer, located in the non-bending area of the display panel, fills the damascene area; the material hardness of the first metal layer is greater than the material hardness of the second metal layer.

In one embodiment of the present disclosure, the non-bending area includes a first non-bending area and a second non-bending area, and the first non-bending area and the second non-bending area are respectively located on both sides of the bending area; the damascene area includes a first damascene area located in the first non-bending area and a second damascene area located in the second non-bending area; the second metal layer includes a first sub-layer of second metal filled in the first damascene area and a second sub-layer of second metal filled in the second damascene area.

In another embodiment of the present disclosure, the damascene area includes a plurality of damascene sub-areas arranged at intervals in the non-bending area, and the second metal layer includes a plurality of sub-layers of second metal which fill the damascene sub-area; wherein, in a direction perpendicular to the display panel, the thickness of the sub-layer of second metal filled in the damascene sub-area is less than or equal to the thickness of the composite bending support layer.

In another embodiment of the present disclosure, in a direction perpendicular to the display panel, the thickness of the second metal layer filled in the damascene area is equal to the thickness of the composite bending support layer; a contact surface, which is between the first metal layer and the second metal layer filled in the damascene area, and the horizontal plane of the display panel forms a predetermined angle.

In another embodiment of the present disclosure, the second metal layer includes at least a first convex portion and/or a first concave portion, which are located on one side of the contact surface between the second metal layer and the first metal layer; the first metal layer includes a second concave portion which matches with the first convex portion and/or a second convex portion which matches with the first concave portion.

In another embodiment of the present disclosure, in the direction perpendicular to the display panel, the thickness of the second metal layer filled in the damascene area is smaller than the thickness of the composite bending support layer; the projection of a contact surface of the second metal layer and the first metal layer on the display panel covers the projection of the second metal layer on the display panel.

In another embodiment of the present disclosure, in the direction perpendicular to the display panel, the thickness of each portion of the composite bending support layer is equal; the composite bending support layer includes an upper surface which is close to the panel body and a lower surface which is away from the panel body; on the upper surface or the lower surface, the first metal layer and the second metal layer are coplanar.

In another embodiment of the present disclosure, the thermal conductivity of the material of the first metal layer is less than the thermal conductivity of the material of the second metal layer.

In another embodiment of the present disclosure, the display panel includes a bending center line located in the bending area, and a plurality of stress-reducing structures are symmetrically located on both sides of the bending center line in the bending area on the composite bending support layer.

In another embodiment of the present disclosure, the material of the first metal layer is stainless steel, and the material of the second metal layer is copper foil.

In this application, a composite bending support layer, which is provided on one side of the panel body, comprises a first metal layer and a second metal layer. The first metal layer includes a damascene area located in the non-bending area, and the second metal layer is used to fill the damascene area, so that the first metal layer and the second metal can be combined and integrated, effectively reducing the thickness of the flexible display panel. Moreover, since the hardness of the material of the first metal layer is greater than the hardness of the material of the second metal layer, the first metal layer is disposed at least in the bending area, and the second metal layer is disposed in the non-bending area, so that the material of the first metal layer and the material of the second metal layer can both exert corresponding characteristics and improve the bending and recovery ability of the display panel.

DESCRIPTION OF DRAWINGS

Referring to the following drawings, the detailed description of the specific implementations of the present application proposes the technical solutions and other beneficial effects.

DETAILED DESCRIPTION OF EMBODIMENTS

In order to make purposes, technical solutions, and effects of the present application clearer and more specific, the present application is further described in detail below with reference to the accompanying drawings and examples. It should be understood that the specific embodiments described herein are only used to explain the present application, and are not used to limit the present application.

The technical solutions in the embodiments of the present application will be clearly and completely described below in conjunction with the drawings in the embodiments of the present application. Obviously, the described embodiments are only a part of the embodiments of the present application, rather than all the embodiments. Based on the embodiments in this application, all other embodiments obtained by those skilled in the art without creative work shall fall within the protection scope of this application.

In the description of this application, it should be understood that the terms "first" and "second" are only used for description purposes, and cannot be understood as indicating or implying relative importance or implicitly indicating the number of the indicated technical features. Therefore, the features defined with "first" and "second" may explicitly or implicitly include one or more of the features. In the description of the present application, "multiple" means two or more than two, unless otherwise specifically defined.

In the description of this application, unless expressly stipulated and defined otherwise, the "above" or "below" of the first feature of the second feature may include direct contact between the first and second features, or may include the first and second features indirectly contact through other features. The first feature above the second feature means the first feature directly or obliquely above the second feature or means the first feature is higher in level than the second feature; the first feature below the second feature means the first feature directly or obliquely below the second feature or means that the level of the first feature is lower than the second feature.

The following disclosure provides many different embodiments or examples for realizing different structures of the present application. In order to simplify the disclosure of the present application, the components and settings of specific examples are described below. Of course, they are only examples, and are not intended to limit the application. In addition, the present application may repeat reference numerals and/or reference letters in different examples, and this repetition is for the purpose of simplification and clarity, and does not indicate the relationship between the various embodiments and/or settings discussed. In addition, this application provides examples of various specific processes and materials, but those of ordinary skill in the art may be aware of the application of other processes and/or the use of other materials.

Figure 1:
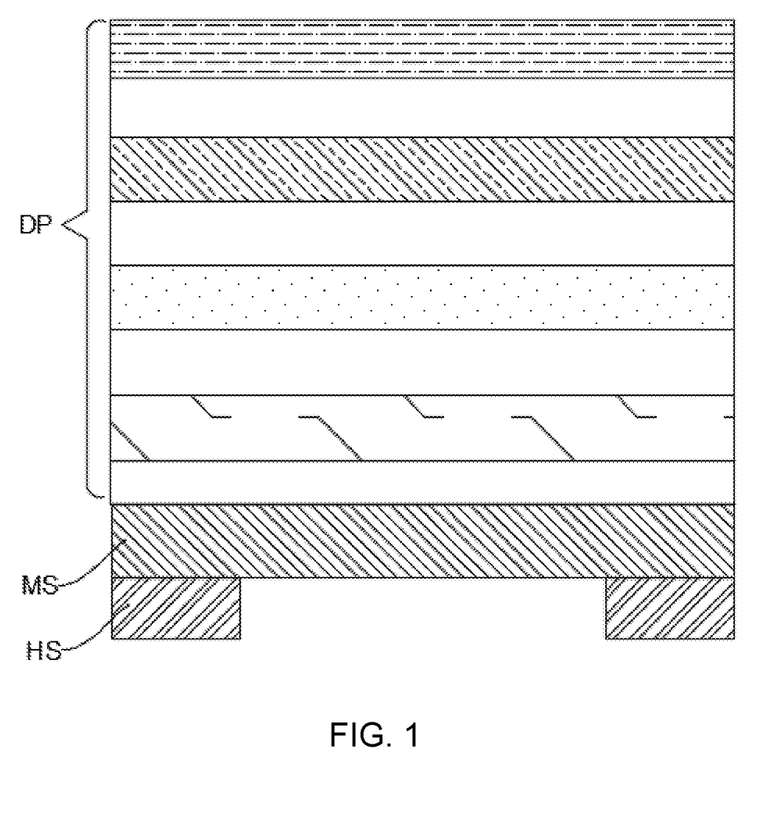
FIG. 1 is a schematic diagram of the structure of a display panel in the prior art of this application.

In current flexible and bendable panels, in order to improve the bending and recovery characteristics, a layer of stainless steel (Steel Use Stainless, SUS) is attached to the bottom of the panel as a flexible support layer. As shown in FIG. 1, during the bending process, the flexible support layer MS deforms to disperse stresses of panel; during the recovery process, the flexible support layer MS deforms and recovers to lead the panel to be flat. This flexible support layer MS is generally thicker than other layers; the thickness of flexible support layer MS usually is about 150 um.

Below the flexible support layer MS, in order to evenly disperse the heat and electromagnetic shielding generated during the use of the device, a heat dissipation layer HS will be added into the panel to increases the thickness of the entire flexible screen but not favorable to the thinning of the display panel; the material of heat dissipation layer HS is copper foil; the thickness of heat dissipation layer HS is usually about 80 um.

In order to solve the above technical problems, the present disclosure provides the following technical solutions.

The technical solution of the present application will be described below in conjunction with specific embodiments.

Figure 2:
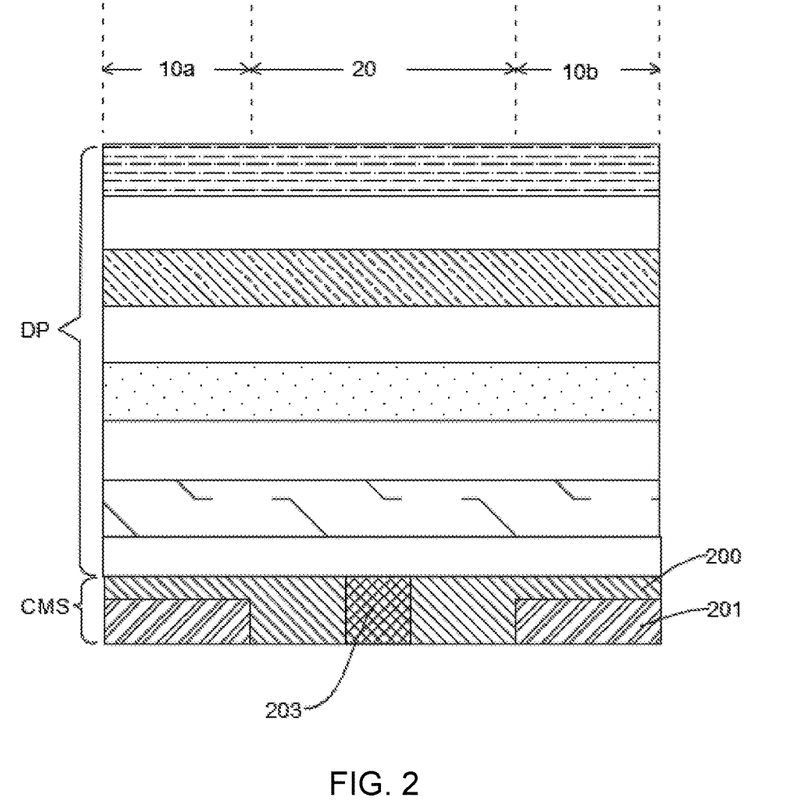
FIG. 2 is a schematic diagram of the structure of a display panel in an embodiment of the application.

The present application provides a display panel, as shown in FIG. 2, including a bending area 20 and a non-bending area. The display panel includes a panel body DP and a composite bending support layer CMS disposed on one side of the panel body DP, and the composite bending support layer CMS includes a first metal layer 200 and a second metal layer 201.

Wherein, the first metal layer 200, at least located in the bending area 20 of the display panel, includes a damascene area located in the non-bending area; the second metal layer 201, located in the non-bending area of the display panel, fills the damascene area; the material hardness of the first metal layer 200 is greater than the material hardness of the second metal layer 201. The first metal layer 200 has the function of bending recovery; it can be understood that although the hardness of the material of the first metal layer 200 is greater than that of the material of the second metal layer 201, the material of the first metal layer 200 also has better bending resistance, so the first metal layer 200 may play a supporting role relative to the second metal layer 201.

Specifically, the panel body DP includes a stacked flexible cover plate, an optical adhesive layer, a polarizer layer, an OLED display structure layer, etc.; the panel body DP specifically realizes the display function of the panel.

Specifically, a composite bending support layer CMS is arranged under the panel main body DP, and the composite bending support layer CMS may be a composite metal material with, but not limited, a thickness of 0.04~50 mm. The composite bending support layer CMS includes the first metal layer 200 and the second metal layer 201; the material of the first metal layer 200 may be stainless steel, for example, SUS304; the material of the second metal layer 201 may be copper foil. When above technical solution is adopted, the second metal in the non-bending area can also play a role in heat dissipation.

The first metal layer 200 includes a damascene area located in the non-bending area, and the second metal layer 201 fills the damascene area; The projection shape of the second metal layer 201 filled in the damascene area on the composite bending support layer CMS may be a circle, a square, a diamond, an ellipse, a polygon, etc. The second metal layer 201 can fill up the damascene area partially or completely. The thickness of the second metal layer 201 filled in the damascene area may be less than or equal to the thickness of the composite bending support layer CMS. The damascene area may be in the shape of a virtual cylinder, a virtual prism, or a virtual truncated cone, which can be specifically adjusted according to process requirements, and will not be listed here. The number of damascene area can be one or more, and the damascene areas can be evenly distributed in the non-bending area; with this technical solution, when the material of the filled second metal layer 201 with good heat dissipation may be further improved in heat dissipation.

The method for forming the damascene area on the first metal layer 200 may be etching or laser processing.

Specifically, the second metal layer 201 is disposed in the damascene area; the specific disposing method may be deposition, and the material of the second metal layer 201 may be silver, copper, aluminum alloy, or their combination. This application does not limit the types of materials, and materials that can achieve the heat dissipation effect are within the protection scope of this application. The thickness of the second metal layer 201 may be less than or equal to the thickness of the damascene area.

It should be understandable that, in the present invention, a composite bending support layer CMS is provided on one side of the panel body DP, and the flexible composite bending support layer CMS includes a first metal layer 200 and a second metal layer 201; moreover, The first metal layer 200 includes a damascene area located in the non-bending area, and the second metal layer 201 fills the damascene area, so that the first metal layer 200 and the second metal can be combined and integrated, effectively reducing the thickness of the flexible display pane; also since the hardness of the material of the first metal layer 200 is greater than the hardness of the material of the second metal layer 201, the first metal layer 200 is disposed at least in the bending area 20, and the second metal layer 201 is disposed in the non-bending area, so that the material of the first metal layer 200 and the second metal layer 201 can exert their corresponding characteristics and improve the bending and recovery ability of the display panel.

Figure 3:
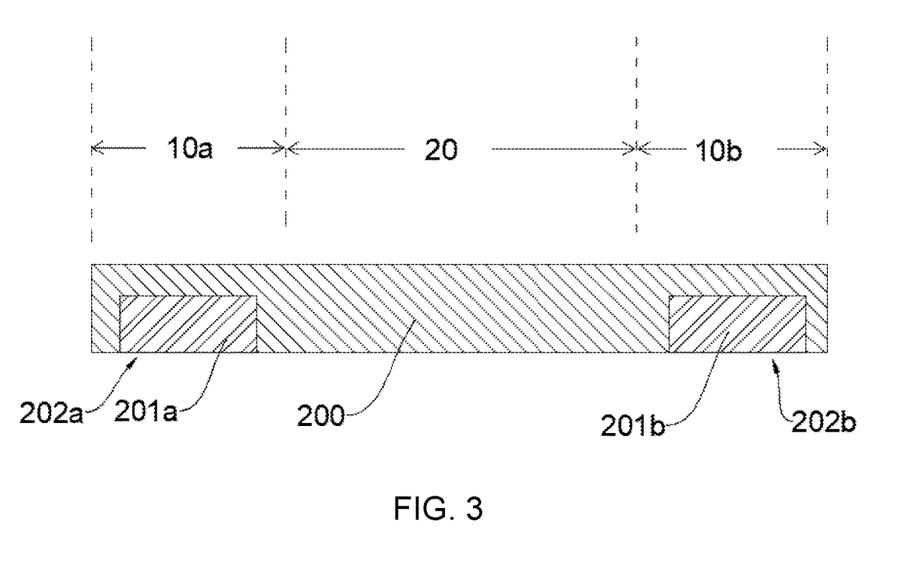
FIG. 3 is a schematic structural diagram of the integrated arrangement of the first metal and the second metal in an embodiment of the application.
Figure 4:
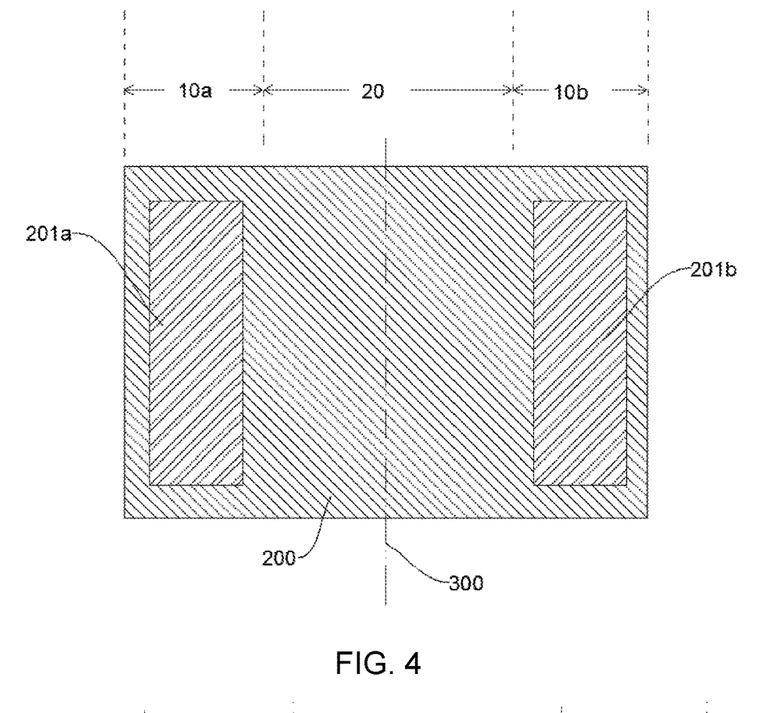
FIG. 4 is a top view of a composite bending support layer in an embodiment of the application.

In one embodiment, as shown in FIGS. 3 to 4, the non-bending area includes a first non-bending area 10a and a second non-bending area 10b. The first non-bending area 10a and the second non-bending area 10b are respectively located on both sides of the bending area 20; the damascene area includes a first damascene area 202a which is located in the first non-bending area 10a and a second damascene area 202b which is located in the second non-bending area 10b; the second metal layer 201 includes a first sub-layer of second metal 201a which is filled in the first damascene area 202a and a second sub-layer of second metal 201b which is filled in the second damascene area 202b.

Specifically, the first damascene area 202a and the second damascene area 202b may also be symmetrically arranged on both sides of the bending center line 300, so that the structure of the composite bending support layer CMS is more uniform. Thus, when bending, the bending stress of the composite bending support layer CMS is more dispersed, preventing the components in the display panel from being broken due to uneven force and affecting the display effect, and effectively prolonging the service life of the display panel.

It should be understandable that, with good heat dissipation performance of the second metal layer 201, dispersing the damascene areas in the first non-bending area 10a and the second non-bending area 10b, a first sub-layer of second metal 201a in the first damascene area 202a, and a second sub-layer of second metal 201b in the second damascene area 202b, the heat dissipation structure can be dispersed on the composite bending support layer CMS, so the bigger contact surface between the second metal layer 201 and the first metal layer 200 may improve the heat dissipation effect.

Figure 5:
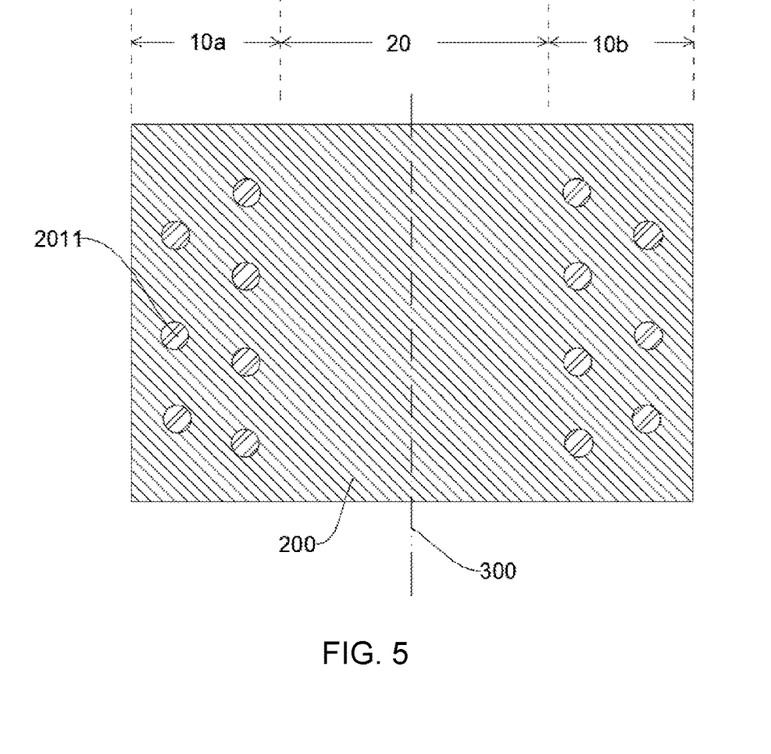
FIG. 5 is a top view of a composite bending support layer with a plurality of damascene sub-areas in the first metal layer in an embodiment of the application.

In the display panel provided by the present invention, as shown in FIG. 5, the damascene area includes a plurality of damascene sub-areas arranged at intervals in the non-bending area, and the second metal layer 201 includes a plurality of sub-layers of second metal 2011 which fill the damascene sub-area; in a direction perpendicular to the display panel, the thickness of the sub-layer of second metal 2011 filled in the damascene sub-area is less than or equal to the thickness of the composite bending support layer CMS.

Specifically, the damascene sub-areas may be evenly dispersed on the composite bending support layer CMS in the non-bending area or may be correspondingly arranged in the non-bending area according to the magnitude of the bending stress at different positions. Since the bending stresses on the two areas of the composite bending support layer CMS in the non-bending area are different, the arrangement density of the damascene sub-areas in the area with large bending stress will be greater than that in the area with small bending stress. By adopting the above technical solution, while achieving a better heat dissipation effect, and the bending stress can be better dispersed, so the service life of the composite bending support layer CMS can be prolonged.

Figure 6:
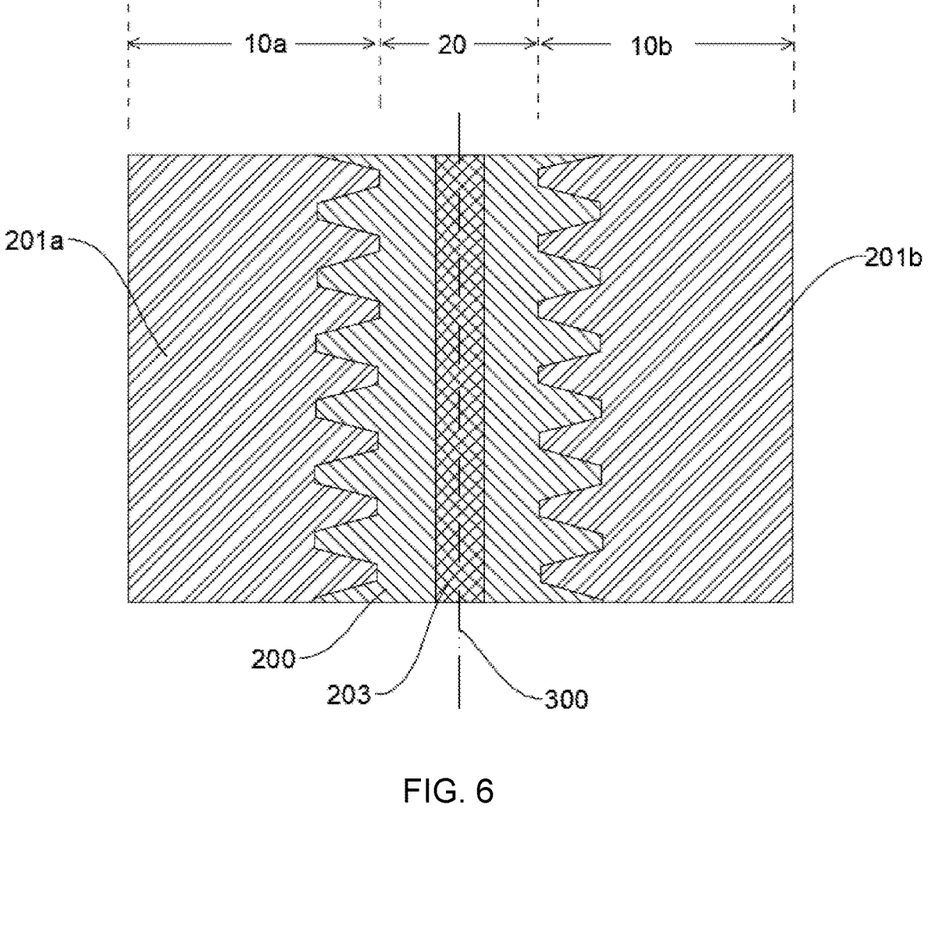
FIG. 6 is a top view of the splicing of the first metal layer and the second metal layer in an embodiment of the application.

In one embodiment, as shown in FIG. 6, the second metal layer 201 includes at least a first convex portion and/or a first concave portion, which are located on one side of the contact surface the second metal layer 201 and the first metal layer 200; the first metal layer 200 includes a second concave portion which matches with the first convex portion and/or a second convex portion which matches with the first concave portion.

Specifically, the orientation and position of the first convex portion and/or the first concave portion, the second concave portion and/or the second convex portion are not fixed.

It should be understandable that the contact surface of the second metal layer 201 and the first metal layer 200 may be a curved surface or a bent surface, so that make larger contact area between the second metal layer 201 and the first metal layer 200 with better heat dissipation. Secondly, the present invention achieves better integration of the first metal layer 200 and the second metal layer 201 by providing, at least, a first convex portion and/or a first concave portion on the contact surface between the second metal layer 201 and the first metal layer 200 and providing the second concave portion which matches with the first convex portion and/or the second convex portion which matches with the first concave portion on the composite bending support layer CMS. By adopting the above technical solution, when the thicknesses of the inlaid area and the composite bending support layer CMS are the same, the relative displacement of the second metal layer 201 and the composite bending support layer CMS during the splicing process can be prevented, so the bonding between the first metal layer 200 and the second metal layer 201 is more stable.

Figure 7:
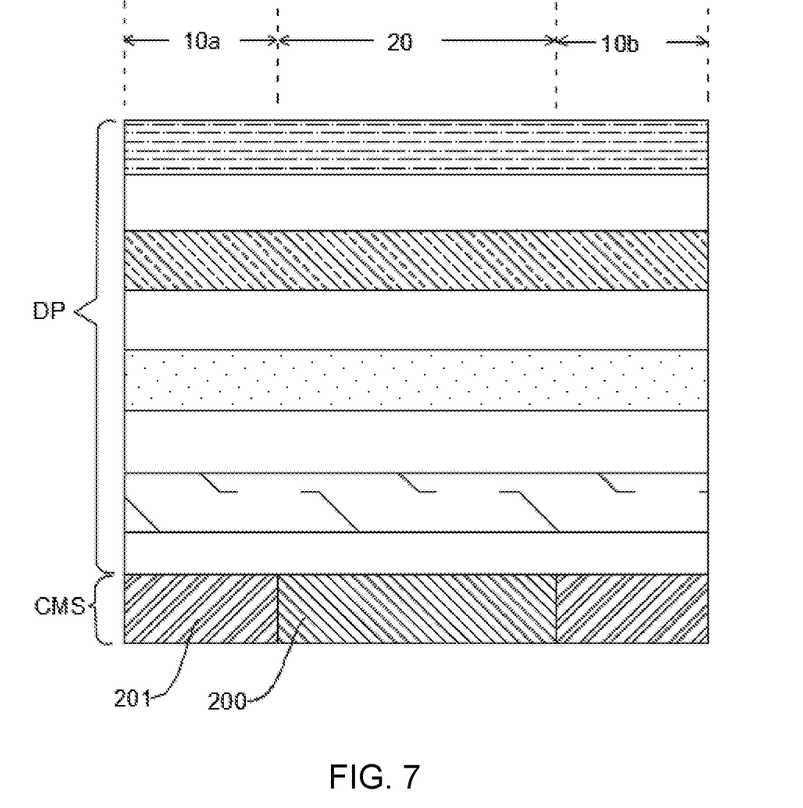
FIG. 7 is a schematic diagram of the structure of the display panel when the second metal layer embedded in the damascene area and the composite bending support layer have the same thickness in an embodiment of the application.

In one embodiment, as shown in FIG. 7, in the direction perpendicular to the display panel, the thickness of the second metal layer 201 filled in the damascene area is smaller than the thickness of the composite bending support layer CMS, and a projection of a contact surface between the second metal layer 201 and the first metal layer 200 on the display panel covers a projection of the second metal layer 201 on the display panel.

It should be understandable that, due to the above technical solution, when the material of the second metal layer 201 has a good heat dissipation function, the effectively increasing of the contact area between the second metal layer 201 and the first metal layer 200 should achieve a better heat dissipation effect.

In one embodiment, in the direction perpendicular to the display panel, the thickness of each portion of the composite bending support layer CMS is equal, and the composite bending support layer CMS includes an upper surface which is close to the panel body DP and a lower surface which is away from the panel body DP; also, on the upper surface or the lower surface, the first metal layer and the second metal layer are coplanar.

It can be specifically understood that, unlike the solution in which the second metal layer 201 and the first metal layer 200 are non-coplanar on the upper or lower surface, this coplanar solution can ensure that the second metal layer 201 not only has better heat dissipation effect but also further simplify the manufacturing process of the composite bending support layer CMS.

In an embodiment, the thermal conductivity of the material of the first metal layer 200 is less than the thermal conductivity of the material of the second metal layer 201.

Specifically, when the material of the first metal layer 200 is stainless steel and the material of the second metal layer 201 may be copper foil.

The adoption of the above technical solution not only enables the second metal layer 201 located in the damascene area to exert a good heat dissipation effect, but also ensures that the integrated first metal layer 200 and the second metal layer 201 can perform their respective functions in the corresponding area; also the composite bending support layer CMS achieves a better bending and heat soaking effect than prior arts.

Figure 8:
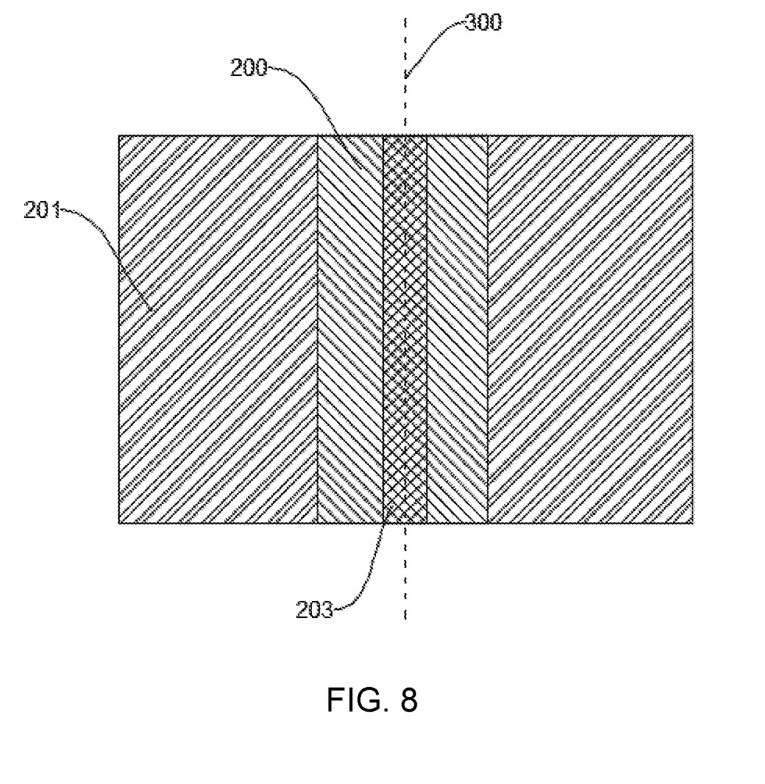
FIG. 8 is a bottom view of the composite bending support layer with the second metal layer covering the non-bending area in an embodiment of the application.

In one embodiment, as shown in FIG. 8, the display panel includes a bending center line 300 located in the bending area 20, and a plurality of stress-reducing structures 203 are symmetrically located on both sides of the bending center line 300 in the bending area 20 on the composite bending support layer CMS.

Specifically, the stress-reducing structure 203 is disposed in the stress-reducing area, and the area of the orthographic projection of the stress-reducing area on the first metal layer 200 is less than or equal to the area of the orthographic projection of the bending area 20 on the first metal layer 200. The stress-reducing structure 203 may be a through hole or a blind hole, and the projection of the stress-reducing structure 203 on the composite bending support layer CMS may be one of an ellipse, a circle, a rectangle, or a regular rectangle. There is no restriction on the shape of the projection, so that may be specifically designed according to process requirements.

It should be understandable that, by arranging the stress-reducing structure 203 symmetrically on both sides of the bending center line 300, the bending stress of the composite bending support layer CMS can be more evenly dispersed, thereby the life of composite bending support layer CMS would be extended effectively.

The present invention also provides a display device, including the display panel provided in any of the foregoing embodiments.

In summary, the present invention provides a composite bending support layer CMS on one side of the panel body DP, the composite bending support layer CMS includes a first metal layer 200 and a second metal layer 201, The first metal layer 200 includes a damascene area located in the non-bending area, and the damascene area is filled with the second metal layer 201, so the first metal layer 200 and the second metal 201 may be more integrate, and the thickness of the flexible display panel would be reduce effectively. Since the hardness of the material of the first metal layer 200 is greater than the hardness of the material of the second metal layer 201, disposing of the first metal layer 200 in the bending area 20 and disposing of the second metal layer 201 in the non-bending area can make the material of the first metal layer 200 and the material of the second metal layer 201 exert their corresponding characteristics and improve the bending and recovery ability of the display panel.

In the above-mentioned embodiments, the description of each embodiment has its own emphasis. For parts that are not described in detail in an embodiment, reference may be made to related descriptions of other embodiments.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

It can be understood that those having ordinary skills of the art may easily contemplate various changes and modifications of the technical solution and technical ideas of the present application and all these changes and modifications are considered within the protection scope of right for the present application.

What is claimed is:

1. A display panel, having a bending area and a non-bending area, wherein the display panel comprises:
   a panel body;
   a composite bending support layer, arranged on one side of the panel body, comprising a first metal layer and a second metal layer;
   wherein the first metal layer, at least located in the bending area of the display panel, comprises a damascene area located in the non-bending area,
   the second metal layer, located in the non-bending area of the display panel, fills the damascene area,
   hardness of a material of the first metal layer is greater than hardness of a material of the second metal layer,
   in a direction perpendicular to the display panel, a thickness of the second metal layer filled in the damascene area is smaller than a thickness of the composite bending support layer, and
   a projection of a contact surface of the second metal layer and the first metal layer on the display panel covers a projection of the second metal layer on the display panel.

2. The display panel according to claim 1, wherein the non-bending area has a first non-bending area and a second non-bending area, and the first non-bending area and the second non-bending area are respectively located on both sides of the bending area;
   the damascene area has a first damascene area located in the first non-bending area and a second damascene area located in the second non-bending area; and
   the second metal layer has a first sub-layer of second metal filled in the first damascene area and a second sub-layer of second metal filled in the second damascene area.

3. The display panel according to claim 1, wherein the damascene area comprises a plurality of damascene sub-areas arranged at intervals in the non-bending area, and the second metal layer comprises a plurality of sub-layers of second metal which fill the damascene sub-areas.

4. The display panel according to claim 1, wherein a contact surface, which is between the first metal layer and the second metal layer filled in the damascene area, and a horizontal plane of the display panel form a predetermined angle.

5. The display panel according to claim 4, wherein the second metal layer comprises at least one first convex portion and/or at least one first concave portion, which are located on one side of the contact surface between the second metal layer and the first metal layer; and
   the first metal layer comprises a second concave portion which matches with the first convex portion and/or a second convex portion which matches with the first concave portion.

6. The display panel according to claim 1, wherein in the direction perpendicular to the display panel, a thickness of each portion of the composite bending support layer is equal,
   the composite bending support layer comprises an upper surface which is close to the panel body and a lower surface which is away from the panel body, and
   on the upper surface or the lower surface, the first metal layer and the second metal layer are coplanar.

7. The display panel according to claim 1, wherein thermal conductivity of the material of the first metal layer is less than the thermal conductivity of the material of the second metal layer.

8. The display panel according to claim 1, wherein the display panel comprises a bending center line located in the bending area, and a plurality of stress-reducing structures is symmetrically located on both sides of the bending center line in the bending area on the composite bending support layer.

9. The display panel according to claim 1, wherein the material of the first metal layer is stainless steel and the material of the second metal layer is copper foil.

10. A display device, comprising a display panel having a bending area and a non-bending area, wherein the display panel further comprises:
   a panel body;
   a composite bending support layer, arranged on one side of the panel body, comprising a first metal layer and a second metal layer;
   wherein the first metal layer, at least located in the bending area of the display panel, comprises a damascene area located in the non-bending area,
      the second metal layer, located in the non-bending area of the display panel, fills the damascene area,
      hardness of a material of the first metal layer is greater than hardness of a material of the second metal layer,
      in a direction perpendicular to the display panel, a thickness of the second metal layer filled in the damascene area is smaller than a thickness of the composite bending support layer, and
      a projection of a contact surface of the second metal layer and the first metal layer on the display panel covers a projection of the second metal layer on the display panel.

11. The display device according to claim 10, wherein the non-bending area has a first non-bending area and a second non-bending area, and the first non-bending area and the second non-bending area are respectively located on both sides of the bending area;
   the damascene area has a first damascene area located in the first non-bending area and a second damascene area located in the second non-bending area; and
   the second metal layer has a first sub-layer of second metal filled in the first damascene area and a second sub-layer of second metal filled in the second damascene area.

12. The display device according to claim 10, wherein the damascene area comprises a plurality of damascene sub-areas arranged at intervals in the non-bending area, and the second metal layer comprises a plurality of sub-layers of second metal which fill the damascene sub-areas.

13. The display device according to claim 10, wherein a contact surface, which is between the first metal layer and the second metal layer filled in the damascene area, and a horizontal plane of the display panel form a predetermined angle.

14. The display device according to claim 13, wherein the second metal layer comprises at least one first convex portion and/or at least one first concave portion, which are located on one side of the contact surface between the second metal layer and the first metal layer; and
   the first metal layer comprises a second concave portion which matches with the first convex portion and/or a second convex portion which matches with the first concave portion.

15. The display device according to claim 10, wherein in the direction perpendicular to the display panel, a thickness of each portion of the composite bending support layer is equal,
   the composite bending support layer comprises an upper surface which is close to the panel body and a lower surface which is away from the panel body, and
   on the upper surface or the lower surface, the first metal layer and the second metal layer are coplanar.

16. The display device according to claim 10, wherein thermal conductivity of the material of the first metal layer is less than thermal conductivity of the material of the second metal layer.

17. The display device according to claim 10, wherein the display panel comprises a bending center line located in the bending area, and a plurality of stress-reducing structures is symmetrically located on both sides of the bending center line in the bending area on the composite bending support layer.

18. The display device according to claim 10, wherein the material of the first metal layer is stainless steel and the material of the second metal layer is copper foil.

* * * * *